(12) United States Patent
Wang et al.

(10) Patent No.: US 9,996,590 B2
(45) Date of Patent: Jun. 12, 2018

(54) SYSTEM AND METHOD FOR IDENTIFYING MISCATEGORIZATION

(71) Applicant: eBay Inc., San Jose, CA (US)

(72) Inventors: Dingxian Wang, Shanghai (CN); David Goldberg, Palo Alto, CA (US); Xiaoyuan Wu, Shanghai (CN); Yuanjie Liu, Shanghai (CN)

(73) Assignee: eBay Inc., San Jose, CA (US)

( * ) Notice: Subject to any disclaimer, the term of this patent is extended or adjusted under 35 U.S.C. 154(b) by 349 days.

(21) Appl. No.: 14/986,172

(22) Filed: Dec. 31, 2015

(65) Prior Publication Data

US 2017/0192975 A1 Jul. 6, 2017

(51) Int. Cl.
G06F 17/30 (2006.01)
G06N 99/00 (2010.01)

(52) U.S. Cl.
CPC .... *G06F 17/3053* (2013.01); *G06F 17/30477* (2013.01); *G06N 99/005* (2013.01)

(58) Field of Classification Search
USPC .................................................. 707/706, 723
See application file for complete search history.

(56) References Cited

U.S. PATENT DOCUMENTS

| 8,370,336 B2 * | 2/2013 | Dumon | G06F 17/30979 707/723 |
| 8,527,357 B1 * | 9/2013 | Ganesan | G06Q 30/06 705/26.1 |
| 8,621,626 B2 * | 12/2013 | Alme | G06F 21/563 713/187 |
| 8,996,495 B2 * | 3/2015 | Rehman | G06F 17/3053 707/706 |
| 9,104,960 B2 * | 8/2015 | Bottou | G06Q 30/0242 |
| 9,116,945 B1 * | 8/2015 | Riley | G06F 17/30864 |
| 9,129,274 B1 * | 9/2015 | Mocko | G06Q 20/20 |
| 9,177,293 B1 * | 11/2015 | Gagnon | G06Q 10/107 |
| 9,215,512 B2 * | 12/2015 | Cohen | G11B 27/034 |

* cited by examiner

*Primary Examiner* — Kim Nguyen
(74) *Attorney, Agent, or Firm* — Schwegman Lundberg & Woessner, P.A.

(57) ABSTRACT

A categorization analysis system is provided. The categorization analysis system includes one or more hardware processors, a memory including a first plurality of listings categorized in a first target category, and a categorization analysis engine executing on the one or more hardware processors. The categorization analysis engine is configured to determine a label for each listing including performing a search on title, select a set of training listings based on the determined labels, train a first model using the set of training listings and the determined labels, the first model being a classification model configured to classify categorization of listings, identify a suspect listing categorized in the first target category, apply the suspect listing to the first model, thereby generating a categorization result for the suspect listing, the categorization result indicating miscategorization of the suspect listing, and identify the suspect listing in the memory as miscategorized.

20 Claims, 8 Drawing Sheets

SYSTEM AND METHOD FOR IDENTIFYING MISCATEGORIZATION

TECHNICAL FIELD

Embodiments of the present disclosure relate generally to categorization of listings and, more particularly, but not by way of limitation, to systems and methods for identifying miscategorization of listings.

BACKGROUND

Some online e-commerce systems or sites allow sellers to categorize the items offered for sale by the sites. For example, a site may define a category "smartphones", intended to be used for various mobile cellular phone computing devices. However, when generating a new listing, a seller may assign the listing to an inaccurate, mistaken, or otherwise improper category. For example, a seller of a smartphone cover may assign the listing to the "smartphones" category. Since a smartphone cover is not a smartphone, even though the listing may be related to smartphones, the category may be considered improper. These "miscategorized" listings can cause problems within the site. For example, when users of the site search or browse in under the "smartphones" category, these miscategorized items may appear and clutter the user's search with listings that are not smartphones. Further, in some categories, there may be many such miscategorized listings. If the search results are sorted by price, for example, all of the lower-cost, miscategorized smartphone covers may dominate the early results of the search, leading to user frustration with the search results. Further, these miscategorized items cause a technical problem with the e-commerce system, causing the site to scan, identify, and transmit over the Internet additional network traffic associated with the miscategorized items. As such, miscategorized items cause a computational and network bandwidth burden for the site, as well as users of the site.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used. Like numbers in the Figures indicate like components.

DETAILED DESCRIPTION

Figure 1:
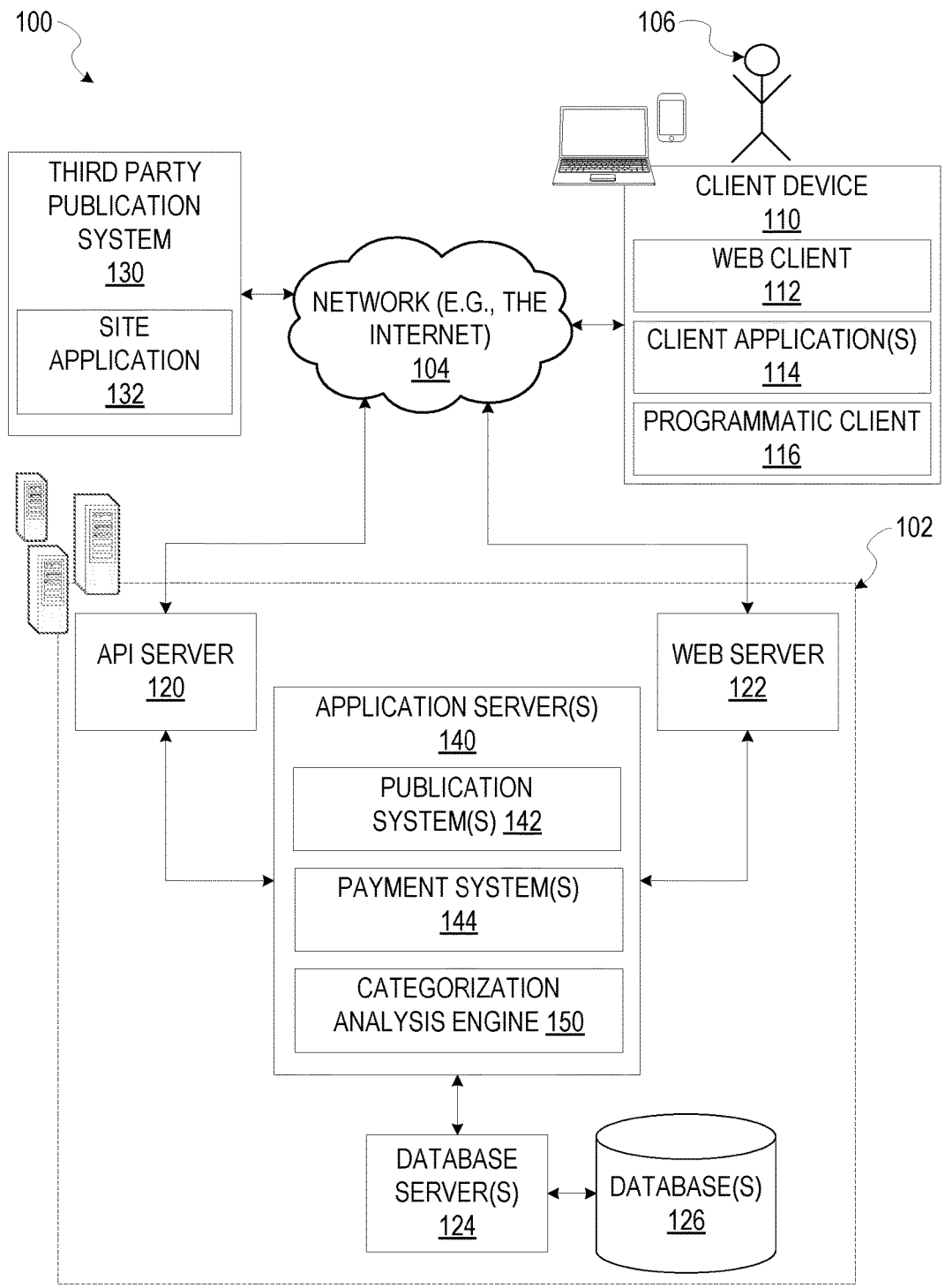
FIG. 1 illustrates a network diagram depicting an example online e-commerce system.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

An online e-commerce system described herein allows online sellers to list items for sale to online buyers (e.g., over the Internet). When generating a new listing, the e-commerce system may allow the sellers to assign one or more categories to the listing, or may recommend one or more categories for the listing, or may assign one or more categories for the listing. The categories are descriptive identifiers provided by the online e-commerce system that, for example, describe a class of merchandise, or a type of product (e.g., "baby diaper carriers" or "smartphones"). These categories, as originally provided or assigned to a listing, are referred to herein as "initial categories" for the listing, or the categories for the listing as they are initially provided (e.g., by the seller, or by the system). These initial categories and listings may also be referred to herein as "suspect categories" or "suspect listings" before being analyzed for miscategorization as described herein. One or more of the initial categories for a listing may be incorrect, mistaken, erroneous, fraudulent, or otherwise improper, whether intentional, accidental, human- or computer-generated. Such a listing is referred to herein as a "miscategorized" or "improperly-categorized" listing, and contrasted with a "properly-categorized" listing (e.g., if a listing is not miscategorized, then it is considered properly categorized, and vice versa).

A categorization analysis engine is described herein. The categorization analysis engine inspects listings on the online e-commerce site to determine whether the listings are miscategorized. In the example embodiment, the categorization analysis engine constructs multiple machine-learned models (e.g., classifiers), where each model is tailored to a particular category. For example, the categorization analysis engine may construct a model for a "smartphones" category, and another model for a "smartphone accessories" category. More specifically, for a given category, the categorization analysis engine identifies a training set (e.g., of historical or current listings, or "training listings"), and identifies key features of the training listings for use in training the model. Further, each training listing includes an associated label (e.g., "miscategorized" or "properly categorized"). The categorization analysis engine then trains the model with the training set. The model, once trained, acts as a classifier for miscategorization.

With the model, the categorization analysis engine processes one or more suspect listings (e.g., when a new listing is first entered by the seller). The suspect listing is applied to the model, which generates a result of either "properly categorized" or "miscategorized" for the suspect listing. The categorization analysis result is then stored with the listing (e.g., as an attribute of the listing, or as a flag associated with the offending category). Later, the e-commerce system may use the categorization analysis result for the listing. For example, in one embodiment, a search engine of the e-commerce system may demote or exclude miscategorized listings in search results. In another embodiment, the e-commerce system may withdraw miscategorized listings from the site, or discipline the associated seller, or remove the offending category from the listing (e.g., thereby curing the miscategorization), or output the listing as miscategorized to the seller or to a site administrator (e.g., who may then manually fix the miscategorization). As such, miscategorized listings are identified by the categorization analysis engine.

In some embodiments, identifying the labels of listings may be performed automatically by the categorization analysis engine (e.g., assigning whether a particular training listing is "properly categorized" or "miscategorized", for purposes of model training). Further, the categorization analysis engine may select which listings to use as the training listings for model building. In preparing the training listings for model building, in one embodiment, the categorization analysis engine applies various features of the listing to a set of "labelling rules." The labelling rules are configured to categorize listings into three buckets: "probably properly categorized", "uncertain", and "probably miscategorized". Those listings that are "probably properly categorized" and "probably miscategorized" are added to the training set, while those listings that are "uncertain" are not added to the training set (e.g., discarded, for purposes of training the models). Further, those training listings that are categorized as "probably properly categorized" are labeled as "properly categorized" for purposes of model training. Likewise, those training listings that are categorized as "probably miscategorized" are labelled as "miscategorized" for purposes of model training. As such, the categorization analysis engine is able to automatically select a training set from a set of unlabeled listings. The labeling rules serve to identify those listings for which the label "properly categorized" or "miscategorized" is likely accurate.

FIG. 1 illustrates a network diagram depicting an example online e-commerce system 100. In the example embodiment, the online e-commerce system 100 includes a networked system 102 that provides online subscription services to online users (or "subscribers"), such as a user 106 via a client device 110. The networked system 102 includes a categorization analysis engine 150 for identifying miscategorized listings, and other associated operations, as described herein.

The networked system 102 provides network-based, server-side functionality, via a network 104 (e.g., the Internet or Wide Area Network (WAN)), to the client devices 110 that may be used, for example, by sellers or buyers (not separately shown) of products and services offered for sale through the publication system 142 (e.g., an online marketplace system, provided by publication systems 142 or payment systems 144). FIG. 1 further illustrates, for example, one or both of a web client 112 (e.g., a web browser), client application(s) 114, and a programmatic client 116 executing on client device 110.

Each of the client devices 110 comprises a computing device that includes at least a display and communication capabilities with the network 104 to access the networked system 102. The client device 110 includes devices such as, but not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client devices 110 connects with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 includes one or more applications (also referred to as "apps") 114 such as, but not limited to, a web browser, messaging application, electronic mail (email) application, an e-commerce site application (also referred to as a marketplace application), and the like. In some embodiments, if the e-commerce site application is included in a given one of the client devices 110, then this application is configured to locally provide the user interface and at least some of the functionalities with the application configured to communicate with the networked system 102, on an as needed basis, for data or processing capabilities not locally available (e.g., such as access to a database of items available for sale, to authenticate a user, to verify a method of payment). Conversely, if the e-commerce site application is not included in a given one of the client devices 110, the given one of the client devices 110 may use its web client 112 to access the e-commerce site (or a variant thereof) hosted on the networked system 102. Although only one client device 110 is shown in FIG. 1, two or more client devices 110 may be included in the online e-commerce system 100.

An Application Program Interface (API) server 120 and a web server 122 are coupled to, and provide programmatic and web interfaces respectively to, one or more application servers 140. In the example embodiment, the application servers 140 host the categorization analysis engine 150 that facilitates providing prediction services, as described herein. The application servers 140 are, in turn, shown to be coupled to one or more database servers 124 that facilitate access to one or more databases 126.

In some embodiments, the application servers 140 host one or more publication systems 142 and payment systems 144. The publication system 142, may provide a number of e-commerce functions and services to users that access networked system 102 and/or external sites 130. E-commerce functions/services may include a number of publisher functions and services (e.g., search, listing, content viewing, payment, etc.). For example, the publication system 142 may provide a number of services and functions to users for listing goods and/or services or offers for goods or services for sale, searching for goods and services, facilitating transactions, and reviewing and providing feedback about transactions and associated users. Additionally, the publication system 142 may track and store data and metadata relating to listings, transactions, and user interactions. In some embodiments, the publication system 142 may publish or otherwise provide access to content items stored in application servers 140 or databases 126 accessible to the application servers 140 or the database servers 124. The payment system 144 may likewise provide a number of payment services and functions to users. The payment system 144 may allow users to accumulate value (e.g., in a commercial currency, such as the U.S. dollar, or a proprietary currency, such as "points") in accounts, and then later to redeem the accumulated value for products or items (e.g., goods or services) that are made available via the publication system 142. While the publication system 142 and payment system 144 are shown in FIG. 1 to both form part of the networked system 102, it will be appreciated that, in alternative embodiments, the payment system 144 may form part of a payment service that is separate and distinct from the networked system 102. In other embodiments, the payment system 144 may be omitted from the online e-commerce system 100. In some embodiments, at least a portion of the publication system 142 may be provided on the client devices 110.

Further, while the online e-commerce system 100 shown in FIG. 1 employs a client-server architecture, embodiments of the present disclosure are not limited to such an architecture, and may equally well find application in, for example, a distributed or peer-to-peer architecture system. The various publication and payment systems 142 and 144 may also be implemented as standalone software programs, which do not necessarily have networking capabilities.

The client devices 110 access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 116 and the networked system 102.

In the example embodiment, the categorization analysis engine 150 analyzes categories associated with listings on the networked system 102. The online e-commerce system 100 may enable categories to be assigned to listings. The categories are descriptive identifiers provided by the online e-commerce system that, for example, describe a class of merchandise, or a type of product (e.g., "baby diaper carriers" or "smartphones"). The online e-commerce system 100 may provide a hierarchy of categories, and the listings may be identified with one or more categories in the hierarchy (e.g., where any node in the hierarchy may represent a category). Further, the databases 126 may include features of the listings such as, for example, price, title, description, shipping information, manufacturer information, and so forth.

Figure 2:
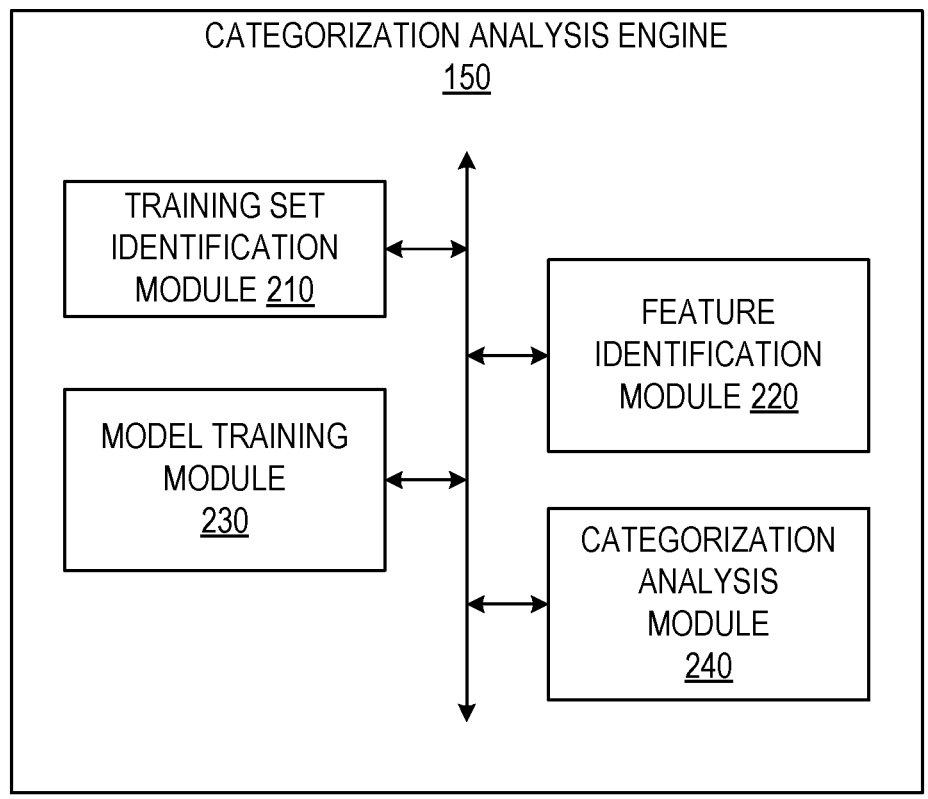
FIG. 2 is a block diagram showing components provided within the categorization analysis engine according to some embodiments.

FIG. 2 is a block diagram showing components provided within the categorization analysis engine 150 according to some embodiments. The categorization analysis engine 150 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124 (both shown in FIG. 1).

The categorization analysis engine 150 provides a number of categorization analysis features related to listings, whereby the categorization analysis engine 150 analyzes the categories initially or currently assigned to the listings to find instances of miscategorization. To this end, the example categorization analysis engine 150 includes a training set identification module 210, a feature identification module 220, a model training module 230, and a categorization analysis module 240.

In the example embodiment, the training set identification module 210 identifies a training set (e.g., of historical or current listings, or "training listings") that will be used to train models for miscategorization. The categorization analysis engine 150 may build models specific to categories of listings. In some embodiments, the training listings for a given training set are selected based on the category(s) assigned to the listings. For example, the training set identification module 210 may select two hundred historical or current listings that are listed within a "smartphones" category. These two hundred listings, the "training listings" for this category, may then be manually labeled (e.g., by a site administrator) as either "properly categorized" or "miscategorized."

In another embodiment, the training set identification module 210 automatically identifies training listings, to use as the training set for the category, along with the associated labels. The training set identification module 210 may examine many historical or current listings (e.g., from a particular category) by applying various features of the listing to a set of "labeling rules." The labeling rules are configured to categorize listings into three buckets: "probably properly categorized", "uncertain", and "probably miscategorized". Those listings that are "probably properly categorized" and "probably miscategorized" are added to the training set, while those listings that are "uncertain" are not added to the training set (e.g., discarded, for purposes of training the models). Further, those training listings that are categorized as "probably properly categorized" are labeled as "properly categorized" for purposes of model training. Likewise, those training listings that are categorized as "probably miscategorized" are labelled as "miscategorized" for purposes of model training. As such, the training set identification module 210 identifies the training listings for the category, and also automatically assigns labels for those training listings. The training set may then be used to train a model for that category (e.g., without need for manual labeling of the training listings).

The feature identification module 220 identifies key features of the training listings for use in training the model. In some embodiments, the feature identification module 220 identifies multiple simple features of the training listings for use as the features with which to build models. Use of many simple features, rather than a few complex features, tends to provide greater accuracy for categorization in this particular application. For example, simple features for a "smartphones" category may include price, weight, memory, brand, GPS-enabled, Touchscreen-enabled, Wi-Fi-capable, operating system, color, camera-enabled, and so forth.

Some simple features are advantageous to distinguish miscategorizations, as they may provide reliable clues that highlight the discrepancy. Some item attributes, for example, may be quite different between categories. Smartphones may have a memory attribute or an operating system attribute, for example, but smartphone covers may not. As such, and for example, the absence of a memory attribute and/or an operating system for a listing in the smartphones category may help the model training to identify miscategorizations of cellphone covers within the smartphones category (e.g., as listings for cellphone covers should not include a memory or an operating system attribute).

Once the training set and associated features have been identified (e.g., for a particular category), the model training module 230 trains the model with the training set. In some embodiments, the model training module 230 uses gradient boosted trees. In other embodiments, the model training module 230 uses Random Forests, or logistic regression, or support vector machines (SVM), or neural networks (e.g., with deep learning methods). The model, once trained, acts as a classifier for miscategorization (e.g., the classes being "properly categorized" and "miscategorized"). As mentioned above, the model training module 230 may train a model for a particular category, and thus may train models for multiple categories. Both precision and recall may be improved (e.g., as compared to a single, combined model) based on using feature sets customized for the category, and/or based on tailoring the model to training listings of items within that category (e.g., highlighting both the types of items commonly found and properly classified in the category, as well as the types of items commonly miscategorized into this category).

The categorization analysis module 240 the applies the model(s) to other listings, or "suspect listings" (e.g., when a new listing is first entered by the seller). More specifically, a particular suspect listing may be associated with one or more initial categories. For example, a baby diaper bag may be categorized (properly, in this example) in a "Diaper Bags" category and a "Baby & Toddler Accessories" category. The categorization analysis module 240 then applies the listing, separately, to each of the models associated with the categories. More specifically, for a particular category, the categorization analysis module 240 extracts the necessary features for the category and applies the suspect listing to the model, which generates a result of either "properly categorized" or "miscategorized" for the suspect listing, as for that category. As such, each category of the suspect listing causes miscategorization analysis using the model tailored for that category. The categorization analysis result is then stored with the listing (e.g., as an attribute of the listing, or as a flag associated with the offending categorization within the listing).

Later, the e-commerce system 100 may use the categorization analysis result for the listing. For example, in one embodiment, a search engine of the e-commerce system may demote or exclude miscategorized listings in search results. In another embodiment, the e-commerce system may withdraw miscategorized listings from the site, or discipline the associated seller, or remove the offending category from the listing (e.g., thereby curing the miscategorization), or output the listing as miscategorized to the seller or to a site administrator (e.g., who may then manually fix the miscategorization). As such, miscategorized listings are identified by the categorization analysis engine 150.

Figure 3:
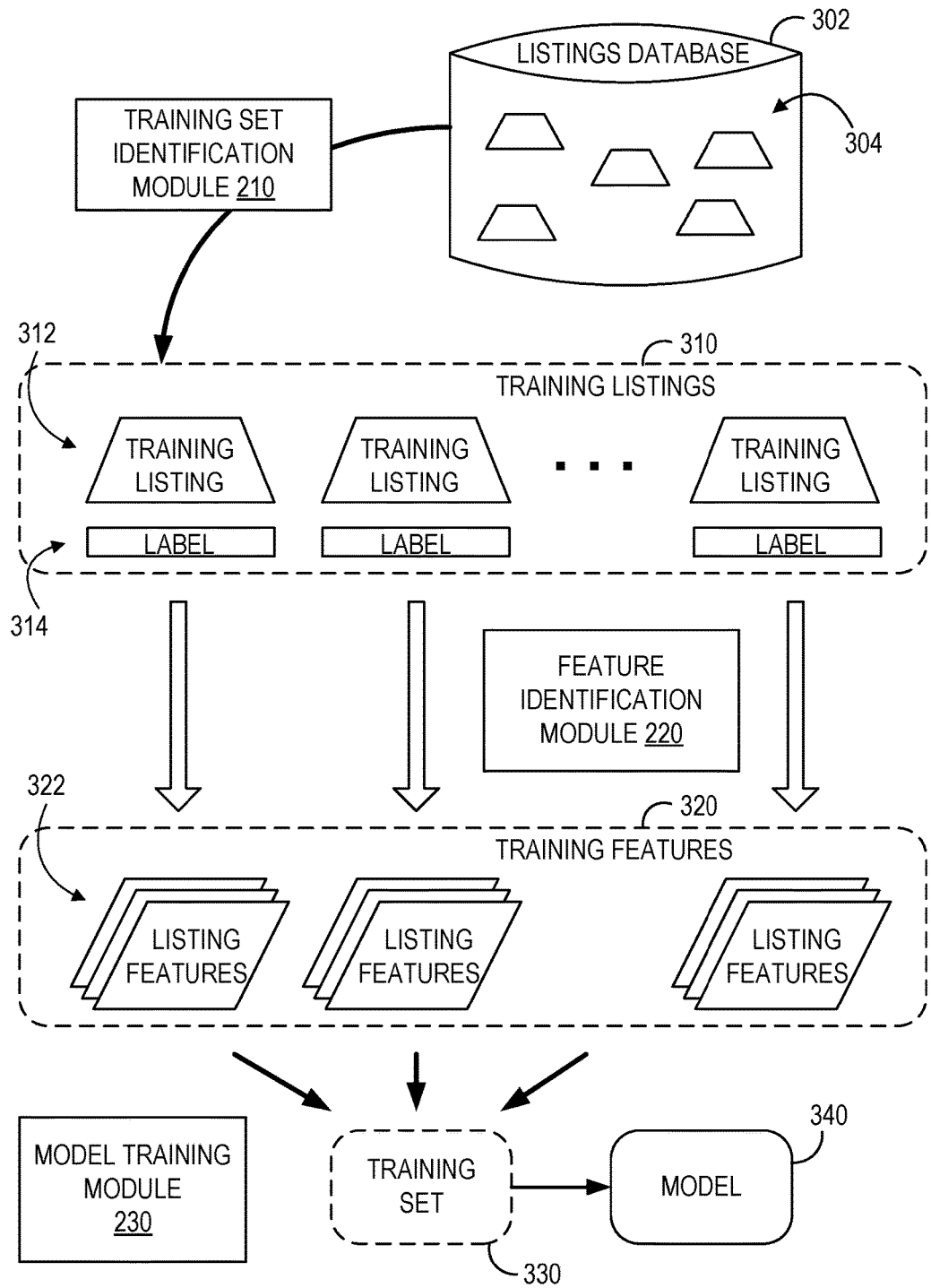
FIG. 3 illustrates components of the categorization analysis engine building a miscategorization analysis model (or just "model") from a set of training listings from the online e-commerce system.

FIG. 3 illustrates components of the categorization analysis engine 150 building a miscategorization analysis model (or just "model") 340 from a set of training listings 310 from the online e-commerce system 100. In the example embodiment, the training set identification module 210 identifies the set of training listings 310 from a database of listings 302. In some embodiments, listings 304 from the listings database 302 are selected by the training set identification module 210 based on a category attribute of the listings 304 (e.g., selecting listings 304 in the category "smartphones"). In other embodiments, listings 304 are provided to the categorization analysis engine 150 (e.g., selected by an administrator). In still other embodiments, listings 304 are automatically determined based on a set of labeling rules, as described in detail below with respect to FIG. 5. In any case, the identified listings 304 become the training listings 312 in the set of training listings 310 to be used for training the model 340.

In the example embodiment, all of the training listings 312 are categorized in a "target category", or a single category for which the model 340 is built. Some or all of the training listings 312 may also be categorized into additional categories (e.g., more than one). For example, a cover for a smartphone may be categorized (e.g., properly) in a "smartphone accessories" category and (e.g., improperly, or miscategorized) in a "smartphone" category. The target category may be provided to the training set identification module 210, or to the categorization analysis engine 150 more broadly. As such, the model 340 is configured to have an associated category (e.g., the target category) with which it is tailored to operate.

Further, each training listing 312 has an associated label 314. The labels 314 are used for model training purposes to define how the associated training listing 312 is defined or categorized (e.g., as either "properly categorized" or "miscategorized" in relation to the target category). In other words, each of the training listings 312 have a predefined determination, prior to model building, as to whether that listing 312 falls within one category or another, and the label 314 is what identifies that determination for the associated training listing. In some embodiments, the labels 314 are pre-defined or assigned to the training listings (e.g., by an administrator who evaluates each of the training listings manually). In other embodiments, the labels 314 are determined by the training set identification module 210, as described in detail below with respect to FIG. 5.

For each training listing 312, the feature identification module 220 identifies a set of listing features 322 (e.g., as described above) for each training listing 312. Each of the sets of listing features 322 (collectively identified as training features 320 in FIG. 3), along with the labels 314 of the associated training listings 312, represent the training set 330 used to build or train the model 340 (e.g., for the target category).

The model training module 230 trains the model 340 with the training set 330. In the example embodiment, the model 340 is trained using gradient boosted trees. As such, the resulting model 340 is configured to act as a classifier for the types of training features 320 used during model construction and, for those features (e.g., of a suspect listing, the "new observation" in the parlance of statistical classification), generate a category (e.g., the "class determination") of either "properly categorized" or "miscategorized".

In some embodiments, and as mentioned above, the categorization analysis engine 150 may generate separate models 340 for various categories defined by the online e-commerce system 100 (e.g., multiple target categories, one target category per model). As such, the categorization analysis engine 150 may perform the steps shown in FIG. 3 for each of those categories. In other words, and for example, separate sets of training listings 310 may be identified for the category "smartphones", the category "smartphone accessories", and the category "baby diaper bags", each acting as the target category for their own model build. As such, separate sets of training features 320 may be identified for the associated sets of training listings 310. Accordingly, separate training sets 330 are used to build individualized models 340 for each of the target categories.

In some embodiments, different training features 320 may be used based on the target category (e.g., based on attributes common to that target category). For example, training features 320 such as "memory" and "operating system" may be used for the "smartphones" category, while training features such as "gender", "material", and "number of pockets" may be used for the "baby diaper bags" category. As such, the performance of models 340 to particular categories may be further enhanced (e.g., leading to better precision and/or recall).

Figure 4:
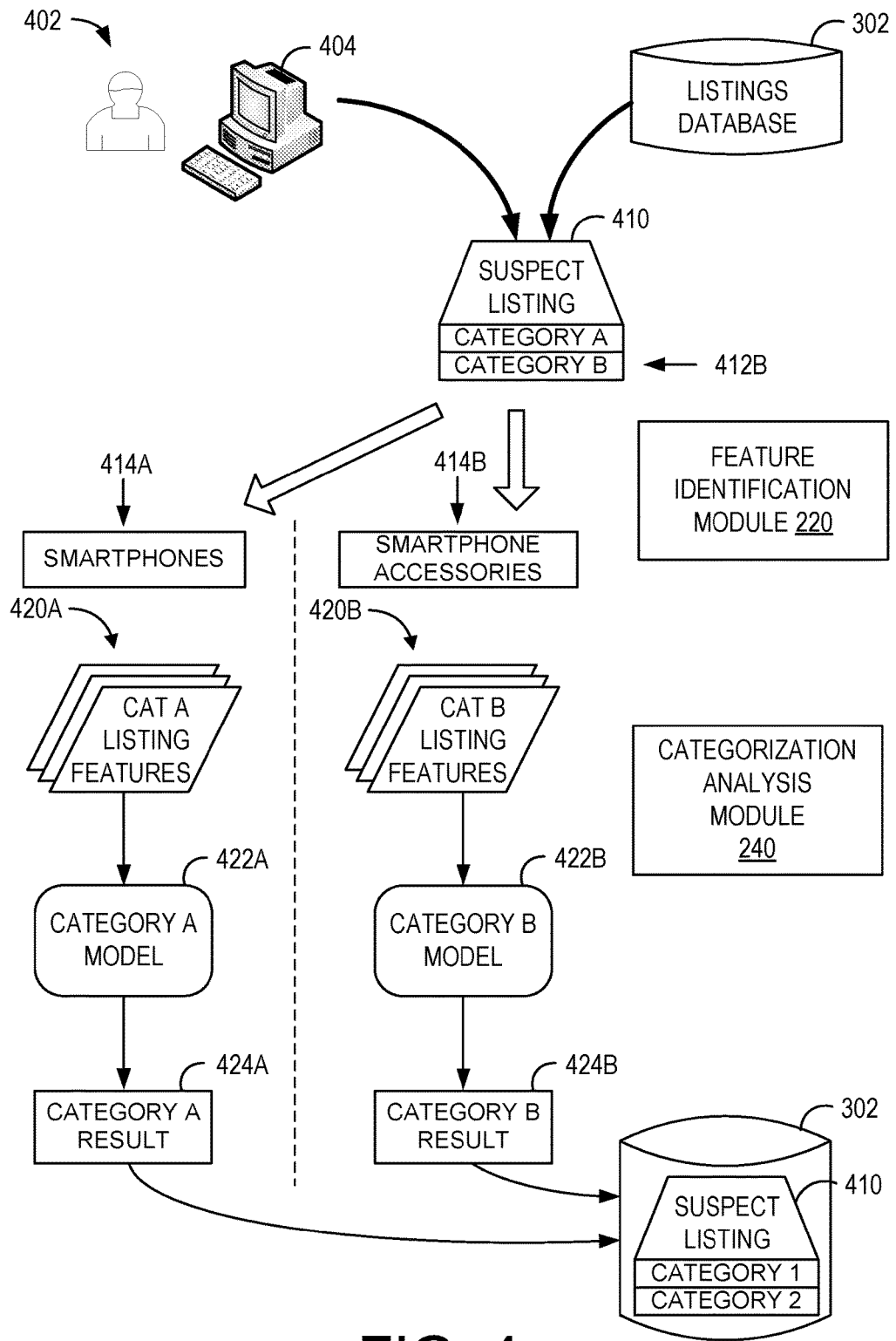
FIG. 4 illustrates application of a suspect listing to multiple models, such as the models built in FIG. 3.

FIG. 4 illustrates application of a suspect listing 410 to multiple models 422A, 422B, such as the models 340 built in FIG. 3. The suspect listing 410 may, for example, be a new listing 410 recently created by a seller 402 and associated computer device 404 on the online e-commerce system 100. The suspect listing 410 may be similar to the listings 304. In some embodiments, the suspect listing 410 may be an existing listing 410 (e.g., stored in and retrieved from the listings database 302). The categorization analysis engine 150 analyzes the suspect listing 410 for miscategorization.

More specifically, the categorization analysis engine 150 automatically analyzes whether or not the suspect listing 410 is miscategorized with respect to one or more categories 412A, 412B (collectively, "categories 412"). The suspect listing 410 may be assigned to any number of categories 412. In the example shown in FIG. 4, the suspect listing 410 is illustrated as assigned to "Category A" 412A and to "Category B" 412B. The categories 412 may have been assigned by the seller 402, or may have been assigned automatically (e.g., by the online e-commerce system 100), or by any other method.

For example, presume that the suspect listing 410 is for a smartphone case or cover (e.g., an accessory for a smartphone device), and further presume that the seller 402 assigned the suspect listing 410 for the smartphone to a "smartphones" category, represented by Category A 412A, and also to a "smartphone accessories" category, represented by Category B 412B. As such, the suspect listing 410 does not belong in the "smartphones" category (e.g., because it is not a smartphone, and the online e-commerce system 100 administrators prefer to only have smartphones in this category), but the suspect listing 410 does belong in the "smartphone accessories" category (e.g., the administrators' preferred category for this type of item).

The categorization analysis engine 150 analyzes the suspect listing 410 relative to each of the assigned categories 412. In other words, and continuing the example, the categorization analysis engine 150 analyzes whether the suspect listing 410 is miscategorized with respect to the "smartphones" Category A 412A, and also analyzes whether the suspect listing 410 is miscategorized with respect to the "smartphone accessories" Category B 412B. It should be understood that the results of each analysis may be different.

For each category 412, the categorization analysis engine 150 performs an independent analysis. In the example embodiment, "smartphones" Category A 412A becomes the target category 414A for the first analysis, and "smartphone accessories" Category B 412B becomes the target category 414B for the second analysis. Continuing the example, with the target category 414A of "smartphones", the feature identification module 220 identifies listing features 420A of the suspect listing 410, and based on the target category 414A. The categorization analysis module 240 identifies the model 422A associated with the "smartphones" target category 414A and applies the listing features 420A to the model 422A to generate a categorization result 424A (e.g., "properly categorized" or "miscategorized" with respect to the "smartphones" category). In this example, the model 422A outputs a "miscategorized" result for the suspect listing 410 within the "smartphones" target category 414A.

Similarly, with the target category 414B of "smartphone accessories", the feature identification module 220 identifies listing features 420B of the suspect listing 410, and based on the target category 414B. The categorization analysis module 240 identifies the model 422B associated with the "smartphone accessories" target category 414B and applies the listing features 420B to the model 422B to enerate a categorization result 424B (e.g., "properly categorized" or "miscategorized" with respect to the "smartphone accessories" category). In this example, the model 422B outputs a "properly categorized" result for the suspect listing 410 within the "smartphone accessories" target category 414B.

Figure 5:
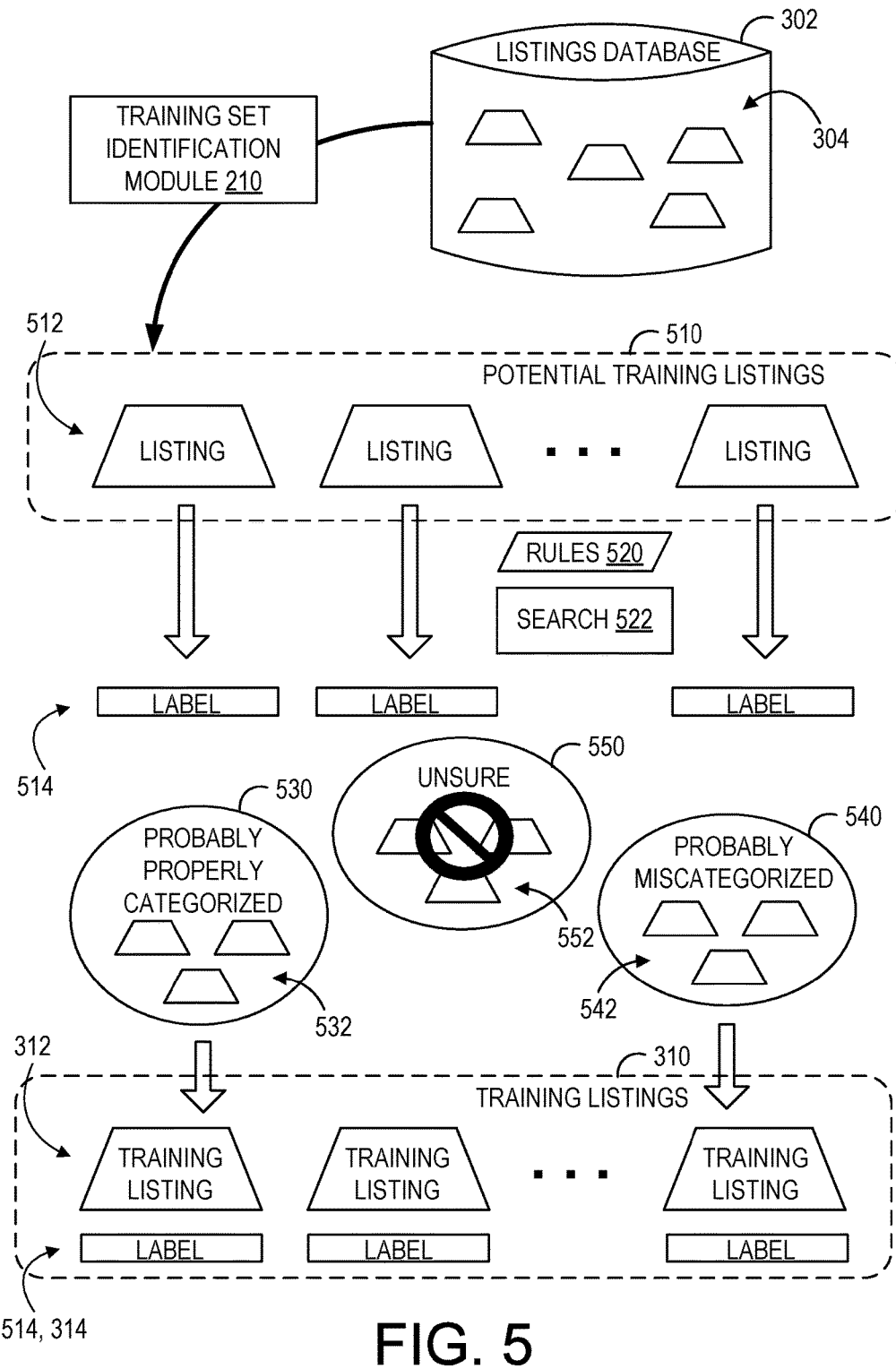
FIG. 5 illustrates an example embodiment in which the training set identification module automatically selects the set of training listings and/or automatically computes labels for the training listings used to create the model shown in FIG. 3.

FIG. 5 illustrates an example embodiment in which the training set identification module 210 automatically selects the set of training listings 310 and/or automatically computes labels 314 for the training listings 312 used to create the model 340 shown in FIG. 3. In the example embodiment, the training set identification module 210 receives or selects a set of potential training listings 510 (e.g., from the listings database 302). Each potential training listing 512 in the set of potential training listings 510 is categorized in a target group, as described above.

In some embodiments, the set of potential training listings 510 are selected randomly (e.g., from historical listings in the target group). However, random selection may not identify many miscategorized listings 512 and, as such, may yield a model 340 that does not perform well in classifying miscategorized listings. In the example embodiment, the set of potential training listings 510 is selected based on price of the listing (e.g., relative to other listings in the target group, or based on pre-determined thresholds). Some sellers miscategorize low-priced items so that they will appear in searches sorted price, low to high (e.g., the $20 smartphone accessory will appear near the top of the sorted search because the properly categorized smartphones have higher prices, e.g., >$100). As such, training set identification module 210 may automatically select at least some of the set of potential training listings 510 based on price, thereby increasing the number of miscategorized listings 512 in the set 510. In some embodiments, the training set identification module 510 selects some potential training listings 512 randomly, some having a low price (e.g., more likely miscategorized), and some having a high price (more likely properly categorized).

In some embodiments, the set of potential training listings 510 are selected by the training set identification module 210 using a previously-constructed model for the target category (e.g., models 422). The training set identification module 210 applies random listings from the target category to the model 422, which generates a classification (e.g., properly categorized or miscategorized). The training set identification module 210 then selects the set of potential training listings 510 based on that classification. For example, the training set identification module 210 may select half of the listings 512 as listings that were classified as "properly categorized" and half of the listings 512 as listings that were classified as "miscategorized". As such, the training set identification module 210 automatically controls the quantity of (likely) miscategorized listings 512 in the set 510.

The training set identification module 210 then uses a set of rules 520 to evaluate each of the potential training listings. The rules 520 evaluate features of the listings 512 to determine a label 514 for each listing. Broadly speaking, the rules 520 are configured to identify those listings 512 that are likely to be either "properly categorized" or that are likely to be "miscategorized". More specifically, the rules 520 label 514 the listings 512 into one of three sets: probably properly categorized 530, probably miscategorized 540, or unsure 550. In the example embodiment, the rules 520 define a first set of logic based on features of the listings that, if evaluated to true, cause the training set identification module 210 to assign a label 514 of "properly categorized" to the listing 512. The rules 520 also define a second set of logic based on features of the listings that, if evaluated to true, cause the training set identification module 210 to assign a label 514 of "miscategorized" to the listing 512. If neither the first set of logic nor the second set of logic evaluate to true (e.g., the rules 520 do not categorize the listing 512 as either "properly categorized" or "miscategorized"), then the listing 512 is assigned a label 514 of "unsure".

In some embodiments, the training set identification module 210 uses a search procedure 522 in lieu of the set of rules 520. To determine the label 514 for a particular listing 512, the search procedure 522 includes performing a search (e.g., a ranked search) of other active or historical listings using the title of the listing 512 (e.g., searching for other items with similar titles). From the search results, a number of returned listings are identified (e.g., the top 5 best-matched items, or the top 100 best-matched items). If more than a pre-determined percentage ("upper threshold") of the returned listings are in the target category (e.g., if 80% or more are categorized as the listing 512), then the listing 512 is labeled as "properly categorized." If less than a pre-determined percentage ("lower threshold") of the returned listings are in the target category (e.g., if 20% or less are categorized as the listing 512), then the listing 512 is labeled as "miscategorized." Otherwise, the listing 512 is considered "unsure".

In some embodiments, the target category may be affiliated or associated with one or more other related or "companion" categories. For example, the "smartphones" category may be associated with the "smartphone accessories" category. As such, the training set identification module 210 may select listings from the companion category and label them as "miscategorized" (e.g., as to the target category).

Based on the labels 514 generated by application of the rules 520, the potential training listings 512 are logically categorized into the set of probably properly categorized 530 (e.g., the listings 512 labeled as "properly categorized" listings 532 based on the rules 520), the set of probably miscategorized 540 (e.g., the listings 512 labeled as "miscategorized" listings 542 based on the rules 520), and the set of unsure 550 (e.g., the listings 512 labeled as "unsure" listings 552 based on the rules 520). The unsure listings 552 are discarded, for purposes of model training. Alternatively, and to effect the same results, some embodiments may simply not label those listings 512 that fall into neither probably miscategorized 540 nor probably properly categorized 530 (e.g., effectively ignoring or excluding those listings 512 from the training listings 310 because they are not placed into either set 530 or set 540). The properly categorized listings 532 and the miscategorized listings 542 are then selected as the set of training listings 310. Further, the associated labels 514, as determined by application of the rules 520, are assigned and used as the labels 314 of the training listings 312. As such, the categorization analysis engine 150 automatically selects the set of training listings 310, as well as automatically determines labels 314 those training listings 312.

It should be understood that the categorization class terms "miscategorized", "probably miscategorized", "properly categorized", "probably properly miscategorized", and "unsure", or other such terms, are used herein for ease of explanation. Any such logical classification or labeling mechanisms that enables the systems and methods described herein may be used. For example, "miscategorized" may be labeled with an integer "1", or as a "negative sample", and "properly categorized" may be labeled with an integer "2", or as a "positive sample". Further, the use of the qualifier "probably" (e.g., "probably miscategorized" or "probably properly categorized) is used herein merely to distinguish a tentative labeling (e.g., for listings that are used for purposes of training) from a label that is assigned to a listing as the output of these systems and methods (e.g., after applying model 340 to the listing).

Figure 6:
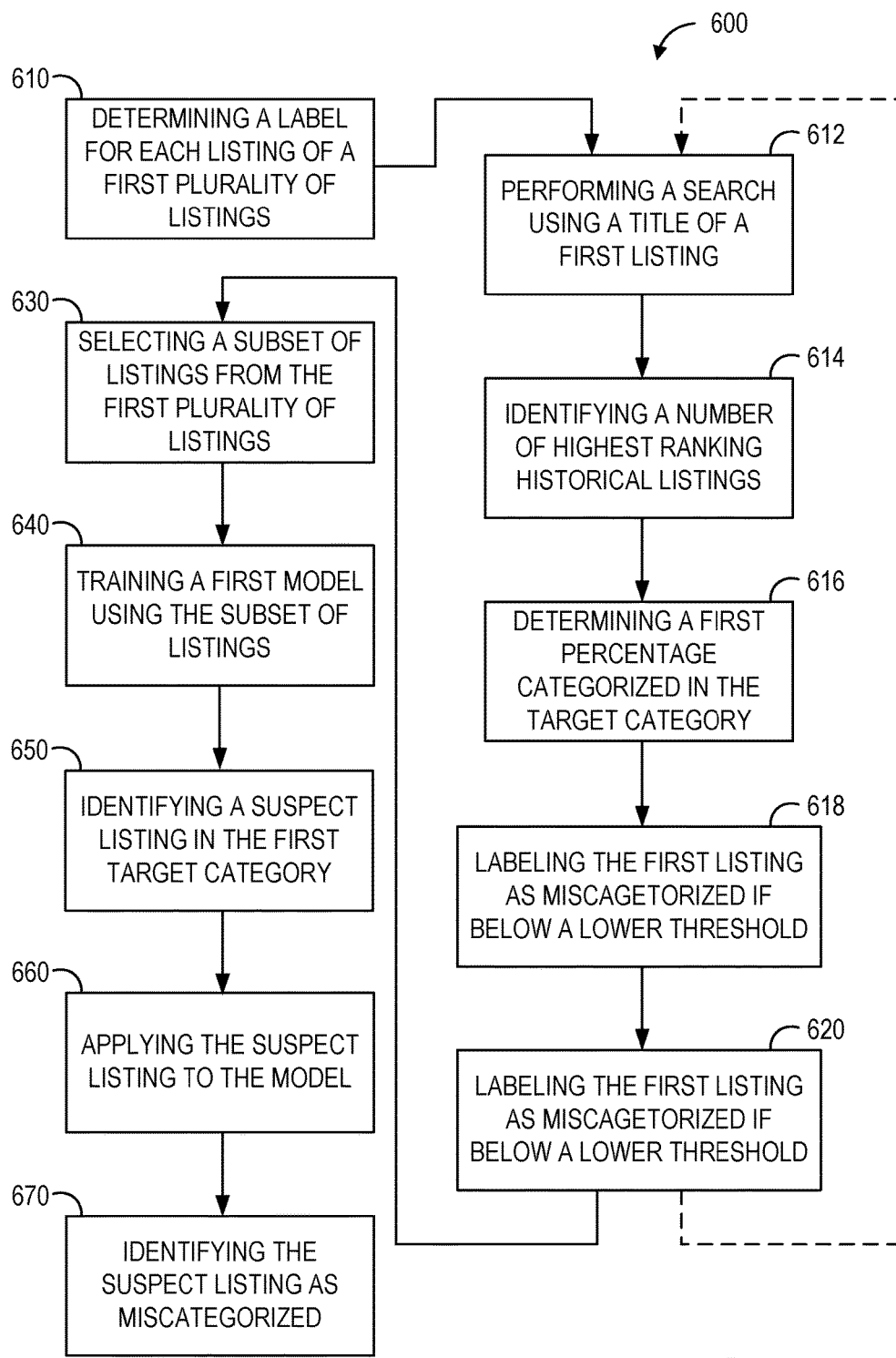
FIG. 6 illustrates a computerized method, in accordance with an example embodiment, for analyzing categorization of a suspect listing.

FIG. 6 illustrates a computerized method 600, in accordance with an example embodiment, for analyzing categorization of a suspect listing. The computerized method 400 is performed by a computing device comprising at least one processor and a memory. In the example embodiment, the computerized method 600 includes determining a label for each listing of a first plurality of listings at operation 610. Each listing of the first plurality of listings is categorized in a first target category. Operation 610 includes performing a search of historical listings using a title of the first listing at operation 612, and identifying a pre-determined number of highest ranking historical listings based on the search of historical listings at operation 614. Operation 610 also includes determining a first percentage of the pre-determined number of highest ranking historical listings that are categorized in the target category at operation 616. Operation 610 further includes labeling the first listing as miscategorized if the first percentage is below a lower threshold percentage at operation 618, and labeling the first listing as properly categorized if the first percentage is above an upper threshold percentage at operation 620.

At operation 630, method 600 includes selecting a subset of listings from the first plurality of listings based on the determined labels, the subset of listings being a set of training listings. In some embodiments, operation 630 includes selecting listings from the first plurality of listings having the label of properly categorized or miscategorized. At operation 640, method 600 includes training a first model associated with the first target category using the set of training listings and the determined labels, the first model being a classification model configured to classify categorization of listings. At operation 650, method 600 includes identifying a suspect listing that is categorized in the first target category. At operation 660, method 600 includes applying the suspect listing to the first model, thereby generating a categorization result for the suspect listing relative to the first target category, the categorization result indicating miscategorization of the suspect listing. At operation 670, method 600 includes identifying the suspect listing in the memory as miscategorized.

In some embodiments, method 600 also includes identifying a first set of listing features associated with the first target category, and training the first model based on the first set of listing features. In some embodiments, method 600 includes selecting the first plurality of listings from a database of listings based on the target category. In some embodiments, the suspect listing is additionally associated with a second target category, and method 600 further includes training a second model associated with the second target category, and applying the suspect listing to the second model, thereby generating a second categorization result for the suspect listing relative to the second target category.

In some embodiments, method 600 also includes determining a label for a second listing of the first plurality of listings that includes identifying a companion category that is associated with the target category, and identifying the second listing as miscategorized if the second listing is categorized in the companion category. In some embodiments, method 600 also includes selecting the first plurality of listings from a database of listings based on a price of the listing.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 7:
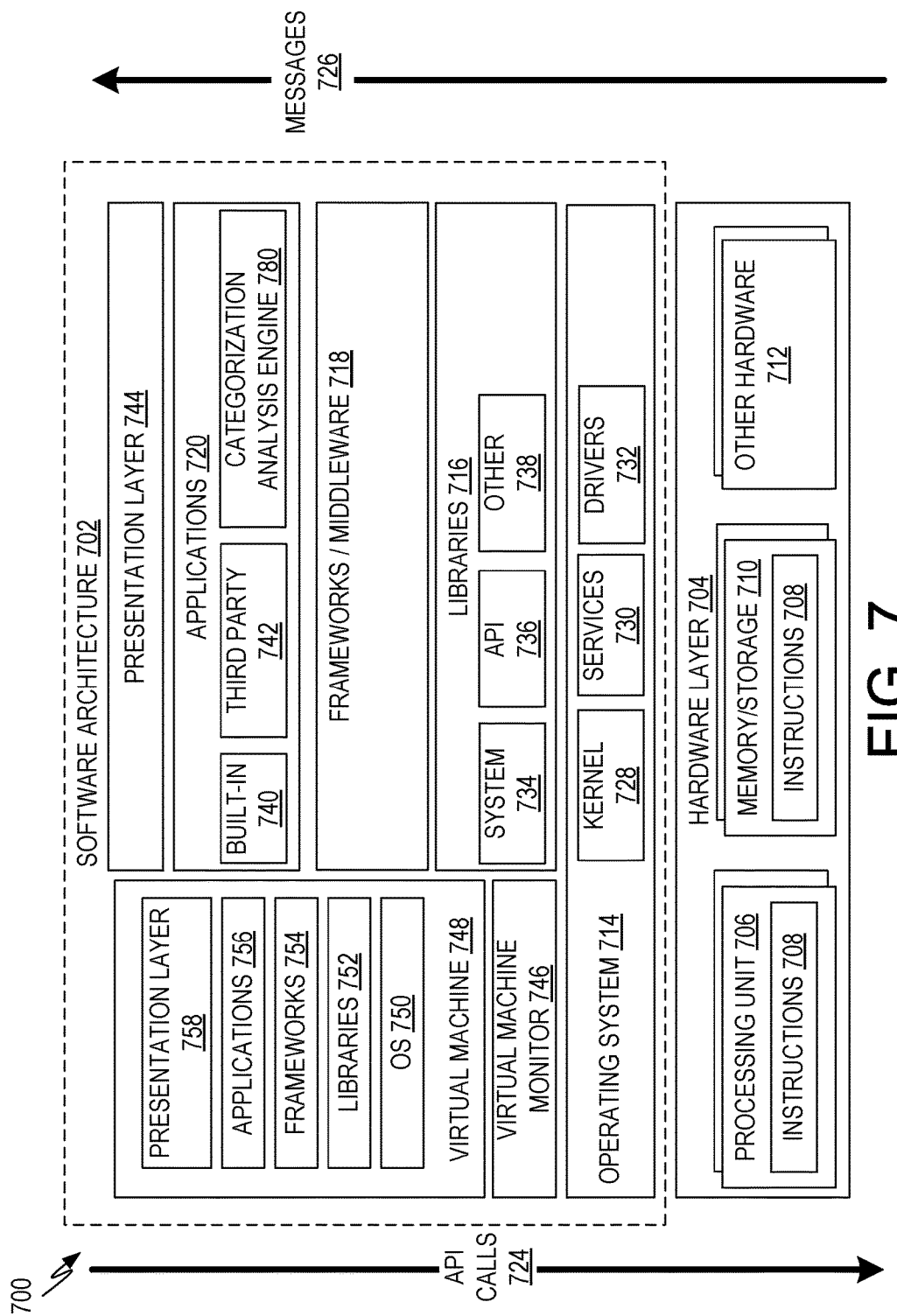
FIG. 7 is a block diagram illustrating an example software architecture, which may be used in conjunction with various hardware architectures herein described, to perform categorization analysis of listings on an online e-commerce system.

FIG. 7 is a block diagram 700 illustrating an example software architecture 702, which may be used in conjunction with various hardware architectures herein described, to perform categorization analysis of listings (e.g., on an online e-commerce system 100). A categorization analysis engine 780 may be similar to the categorization analysis engine 150, which is shown in an application layer 720, but may be provided in whole or in part at other layers shown in FIG. 7. FIG. 7 is a non-limiting example of a software architecture 702 and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 7, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures 702 have all layers. For example, some mobile or special purpose operating systems 714 may not provide the frameworks/middleware 718, while others may provide such a layer. Other software architectures 702 may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system 714 or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system 714 such as iOS™, Android™, Windows® Phone, or other mobile operating systems 714. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures 702 use virtual machines. In the example of FIG. 7, this is illustrated by a virtual machine 748. The virtual machine 748 creates a software environment where applications/modules can execute as if they were executing on a hardware machine (such as the machine 800 of FIG. 11, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 8:
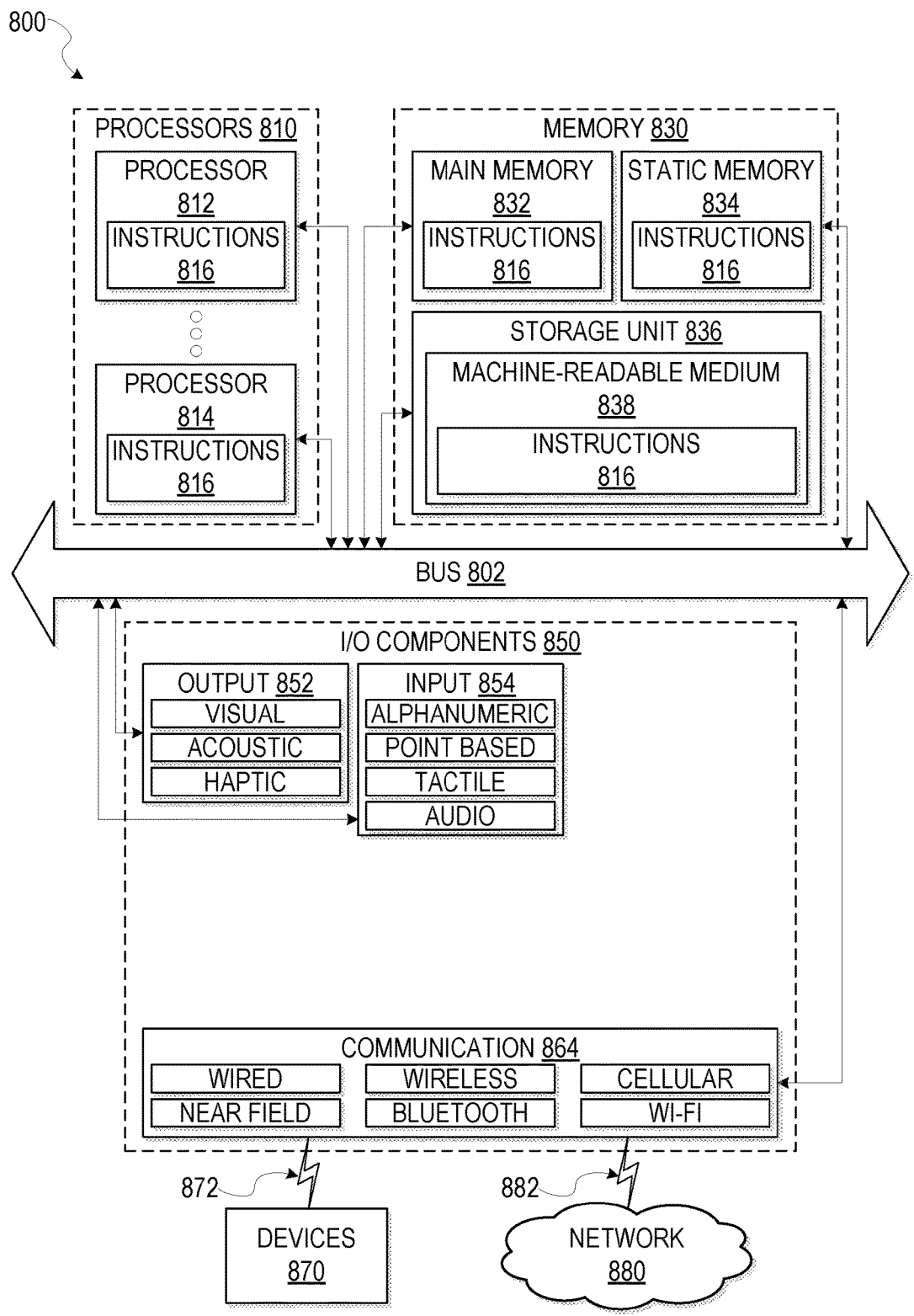
FIG. 8 is a block diagram illustrating components of a machine, according to some example embodiments, configured to read instructions from a machine-readable medium (e.g., a machine-readable storage medium) and perform any one or more of the methodologies discussed herein.

FIG. 8 is a block diagram illustrating components of a machine 800, according to some example embodiments, configured to read instructions 816 from a machine-readable medium 838 (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions 816 transform the general, non-programmed machine 800 into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 812 and a processor 814 that may execute the instructions 816. The term "processor" is intended to include a multi-core processor 812 that may comprise two or more independent processors 812, 814 (sometimes referred to as "cores") that may execute instructions 816 contemporaneously. Although FIG. 8 shows multiple processors 812, 814, the machine 800 may include a single processor 812 with a single core, a single processor 812 with multiple cores (e.g., a multi-core processor), multiple processors 812, 814 with a single core, multiple processors 812, 814 with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions 816 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine 800 will depend on the type of machine. For example, portable machines 800 such as mobile phones will likely include a touch input device or other such input mechanisms, while a headless server machine 800 will likely not include such a touch input device. It will be appreciated that the input/output (I/O) components 850 may include many other components that are not shown in FIG. 8. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another Term Usage Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A categorization analysis system comprising:
    one or more hardware processors;
    a memory including a first plurality of listings, each listing of the first plurality of listings is categorized in a first target category; and
    a categorization analysis engine, executing on the one or more hardware processors, configured to:
        determine a label for each listing of the first plurality of listings, wherein determining a label for a first listing of the first plurality of listings includes:
            performing a search of historical listings using a title of the first listing;
            identifying a pre-determined number of highest ranking historical listings based on the search of historical listings;
            determining a first percentage of the pre-determined number of highest ranking historical listings that are categorized in the target category;
            labeling the first listing as miscategorized if the first percentage is below a lower threshold percentage; and
            labeling the first listing as properly categorized if the first percentage is above an upper threshold percentage;
        select a subset of listings from the first plurality of listings based on the determined labels, the subset of listings being a set of training listings;
        train a first model associated with the first target category using the set of training listings and the determined labels, the first model being a classification model configured to classify categorization of listings;
        identify a suspect listing that is categorized in the first target category;
        apply the suspect listing to the first model, thereby generating a categorization result for the suspect listing relative to the first target category, the categorization result indicating miscategorization of the suspect listing; and
        identify the suspect listing in the memory as miscategorized.

2. The categorization analysis system of claim 1, wherein the categorization analysis engine is further configured to:
    identify a first set of listing features associated with the first target category; and
    train the first model based on the first set of listing features.

3. The categorization analysis system of claim 1, wherein selecting the subset of listings from the first plurality of listings based on the determined labels includes selecting listings from the first plurality of listings having the label of properly categorized or miscategorized.

4. The categorization analysis system of claim 1, wherein the categorization analysis engine is further configured to select the first plurality of listings from a database of listings based on the target category.

5. The categorization analysis system of claim 1, wherein the suspect listing is additionally associated with a second target category, wherein the categorization analysis engine is further configured to:
    train a second model associated with the second target category; and
    apply the suspect listing to the second model, thereby generating a second categorization result for the suspect listing relative to the second target category.

6. The categorization analysis system of claim 1, wherein determining a label for a second listing of the first plurality of listings includes:
    identifying a companion category that is associated with the target category; and
    identifying the second listing as miscategorized if the second listing is categorized in the companion category.

7. The categorization analysis system of claim 1, wherein the categorization analysis engine is further configured to select the first plurality of listings from a database of listings based a price of the listing.

8. A computer-implemented method for analyzing categorization, the method comprising:
    determining a label for each listing of a first plurality of listings, each listing is categorized in a first target category, wherein determining a label for a first listing of the first plurality of listings includes:
        performing a search of historical listings using a title of the first listing;

identifying a pre-determined number of highest ranking historical listings based on the search of historical listings;

determining a first percentage of the pre-determined number of highest ranking historical listings that are categorized in the target category;

labeling the first listing as miscategorized if the first percentage is below a lower threshold percentage; and labeling the first listing as properly categorized if the first percentage is above an upper threshold percentage;

selecting a subset of listings from the first plurality of listings based on the determined labels, the subset of listings being a set of training listings;

training a first model associated with the first target category using the set of training listings and the determined labels, the first model being a classification model configured to classify categorization of listings;

identifying a suspect listing that is categorized in the first target category;

applying the suspect listing to the first model, thereby generating a categorization result for the suspect listing relative to the first target category, the categorization result indicating miscategorization of the suspect listing; and identifying the suspect listing in the memory as miscategorized.

9. The computer-implemented method of claim 8, further comprising:

identifying a first set of listing features associated with the first target category; and training the first model based on the first set of listing features.

10. The computer-implemented method of claim 8, wherein selecting the subset of listings from the first plurality of listings based on the determine labels includes selecting listings from the first plurality of listings having the label of properly categorized or miscategorized.

11. The computer-implemented method of claim 8, further comprising selecting the first plurality of listings from a database of listings based on the target category.

12. The computer-implemented method of claim 8, wherein the suspect listing is additionally associated with a second target category, the method further comprising:

training a second model associated with the second target category; and applying the suspect listing to the second model, thereby generating a second categorization result for the suspect listing relative to the second target category.

13. The computer-implemented method of claim 8, wherein determining a label for a second listing of the first plurality of listings includes:

identifying a companion category that is associated with the target category; and identifying the second listing as miscategorized if the second listing is categorized in the companion category.

14. The computer-implemented method of claim 8, further comprising selecting the first plurality of listings from a database of listings based on a price of the listing.

15. A non-transitory machine-readable medium storing processor-executable instructions which, when executed by a processor, cause the processor to:

determine a label for each listing of a first plurality of listings, each listing is categorized in a first target category, wherein determining a label for a first listing of the first plurality of listings includes:

performing a search of historical listings using a title of the first listing;

identifying a pre-determined number of highest ranking historical listings based on the search of historical listings;

determining a first percentage of the pre-determined number of highest ranking historical listings that are categorized in the target category;

labeling the first listing as miscategorized if the first percentage is below a lower threshold percentage; and labeling the first listing as properly categorized if the first percentage is above an upper threshold percentage;

select a subset of listings from the first plurality of listings based on the determined labels, the subset of listings being a set of training listings;

train a first model associated with the first target category using the set of training listings and the determined labels, the first model being a classification model configured to classify categorization of listings;

identify a suspect listing that is categorized in the first target category;

apply the suspect listing to the first model, thereby generating a categorization result for the suspect listing relative to the first target category, the categorization result indicating miscategorization of the suspect listing; and identify the suspect listing in the memory as miscategorized.

16. The machine-readable medium of claim 15, wherein the processor-executable instructions further cause the processor to:

identify a first set of listing features associated with the first target category; and train the first model based on the first set of listing features.

17. The machine-readable medium of claim 15, wherein selecting the subset of listings from the first plurality of listings based on the determine labels includes selecting listings from the first plurality of listings having the label of properly categorized or miscategorized.

18. The machine-readable medium of claim 15, wherein the processor-executable instructions further cause the processor to select the first plurality of listings from a database of listings based on a price of the listing.

19. The machine-readable medium of claim 15, wherein the suspect listing is additionally associated with a second target category, wherein the processor-executable instructions further cause the processor to:

train a second model associated with the second target category; and apply the suspect listing to the second model, thereby generating a second categorization result for the suspect listing relative to the second target category.

20. The machine-readable medium of claim 15, wherein determining a label for a second listing of the first plurality of listings includes:

identifying a companion category that is associated with the target category; and identifying the second listing as miscategorized if the second listing is categorized in the companion category.

* * * * *